May 19, 1936.  O. F. QUARTULLO  2,041,484
MOTOR VEHICLE
Filed April 8, 1931  4 Sheets-Sheet 1

INVENTOR
Orpheus F. Quartullo
by Byrnes, Stebbins, Parmelee & Blenko
his attorneys May 19, 1936.   O. F. QUARTULLO   2,041,484
MOTOR VEHICLE
Filed April 8, 1931   4 Sheets-Sheet 2

INVENTOR
Orpheus F. Quartullo
by
Byrnes, Stebbins, Parmelee & Blenko
his attorneys May 19, 1936.  O. F. QUARTULLO  2,041,484
MOTOR VEHICLE
Filed April 8, 1931  4 Sheets-Sheet 4

INVENTOR
Orpheus F. Quartullo
by
Byrnes, Stebbing, Parmelee & Blenko
his attorneys.

Patented May 19, 1936

2,041,484

UNITED STATES PATENT OFFICE 2,041,484

MOTOR VEHICLE

Orpheus F. Quartullo, Pittsburgh, Pa.

Application April 8, 1931, Serial No. 528,521

9 Claims. (Cl. 180—22)

The present invention relates broadly to the art of motor vehicles, and more particularly to motor vehicles of the truck type employing a plurality of transversely extending drive shafts each of which carries on each end thereof one or more road wheels.

It is customary in the art to which the present invention relates to refer to such structures as "six-wheel trucks". This expression as hereinafter utilized will be understood to cover any truck in which more than one transversely extending rear axle is provided, regardless of the actual number of such axles, their construction, or the number of road wheels which they carry.

From the standpoint of ease of maneuverability, it is desirable to construct six wheel trucks with the rear wheels carried by the individual axles as close to each other as possible. This is due to the fact that in turning corners the rear wheels tend to describe circles having different radii, the difference in the length of the radii increasing as the spacing between the wheels increases. Since the wheels are non-steered, the objection to widely different turning radii for the different wheels will be readily appreciated.

In attempting to meet the difficulty before referred to by placing the wheels in relatively closely adjacent relationship, a new difficulty has presented itself, this new difficulty having to do with the driving means for the axles. It is well understood that with heavy trucks of the general character herein being considered, it is necessary to mount the driving wheels with sufficient flexibility so that the wheels may travel over quite rough ground. It not infrequently happens that the track surfaces of the driving wheels on one side of a truck will lie in planes which are spaced 12 or more inches. This in turn means that the axles which carry the wheels will be carried out of a common horizontal plane by a like amount. In order to maintain a driving relationship between the axles, under such conditions of road displacement, it is necessary to provide the driving means with universal joints. It has been found, however, that when the axles are spaced in closely adjacent relationship, a road displacement of the character indicated will cause the universals to work about relatively sharp angles. In actual practice it has been found that the angularity is frequently such as to result in sufficient friction and therefore heat to completely melt portions of the joints.

It is one of the objects of the present invention to provide a truck in which the driving wheels may be placed in closely adjacent relationship without incurring an objectionable angular relationship in the driving means such as referred to.

The usual truck construction is such that the length of the driving shaft from the transmission to the first rear axle provided therein is about twice as long as the distance between the driving axles themselves.

It is another object of the present invention to provide a structure of such nature that the angular relationship of the driving or propeller shaft and the angular relationship of the short drive shaft between the axles themselves will be such that the angularity is effectively distributed therebetween in accordance with the lengths of the respective shaft sections.

Still another object of the present invention is to provide an improved driving structure for trucks or vehicles of the multi-driven axle type, whereby greater strength together with more efficient driving conditions may be continuously maintained.

It is further customary in the art to provide motor trucks of the six wheel type with extremely heavy springs interposed between the axles, or the axle carrying frames, and the vehicle chassis. Such springs frequently have a weight of as much as 600 lbs. each. With the truck unloaded, the springs perform no useful function since they are stiff enough to preclude any effective spring action. With the truck loaded to capacity, the utility of the springs is likewise destroyed, since in such case the chassis rides directly on the axle frame. The present invention lends itself to a truck structure in which the provision of springs intermediate the chassis and the axles may be completely eliminated.

In the accompanying drawings there is shown for purposes of illustration, and by way of example only, a typical installation embodying the present invention. In the drawings.

For purposes of convenience in the matter of description and understanding of the present invention, the shaft extending rearwardly from the transmission will hereinafter be referred to as the propeller shaft. The short shaft connected thereto and effective for driving the rear axles will be referred to as the short shaft. The two rear axles will be referred to as the driving axles. The sub-frame carrying the driving axles will be referred to as the truck frame, and the main body of the truck as the chassis. The rear wheels will be referred to as driving wheels, regardless of their number, disposition, or arrangement.

Figure 1:
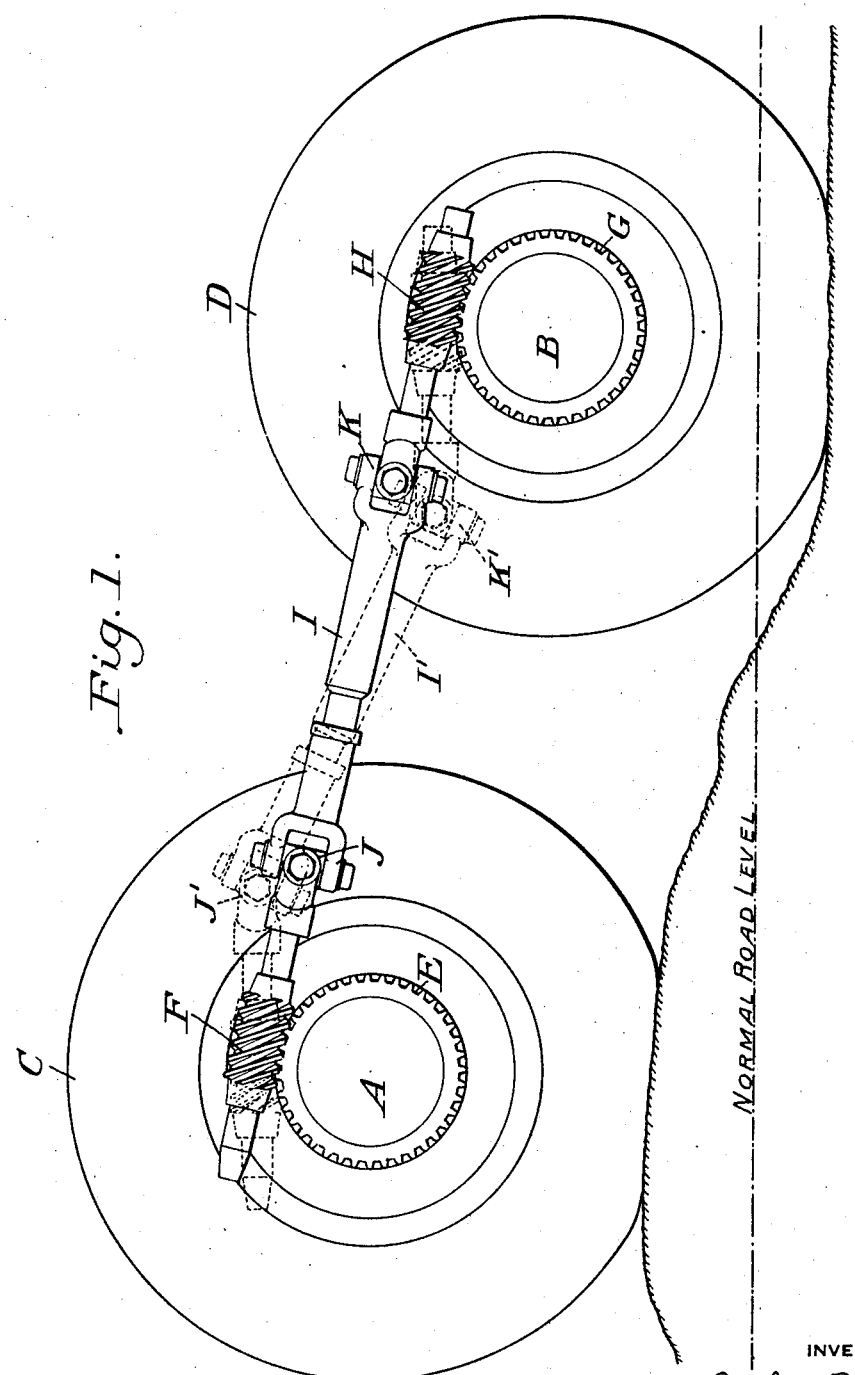
Figure 1 is a diagrammatic view for the purpose of illustrating the maintenance of the driving relationship of the short driving shaft for the two rear axles.
Figure 2:
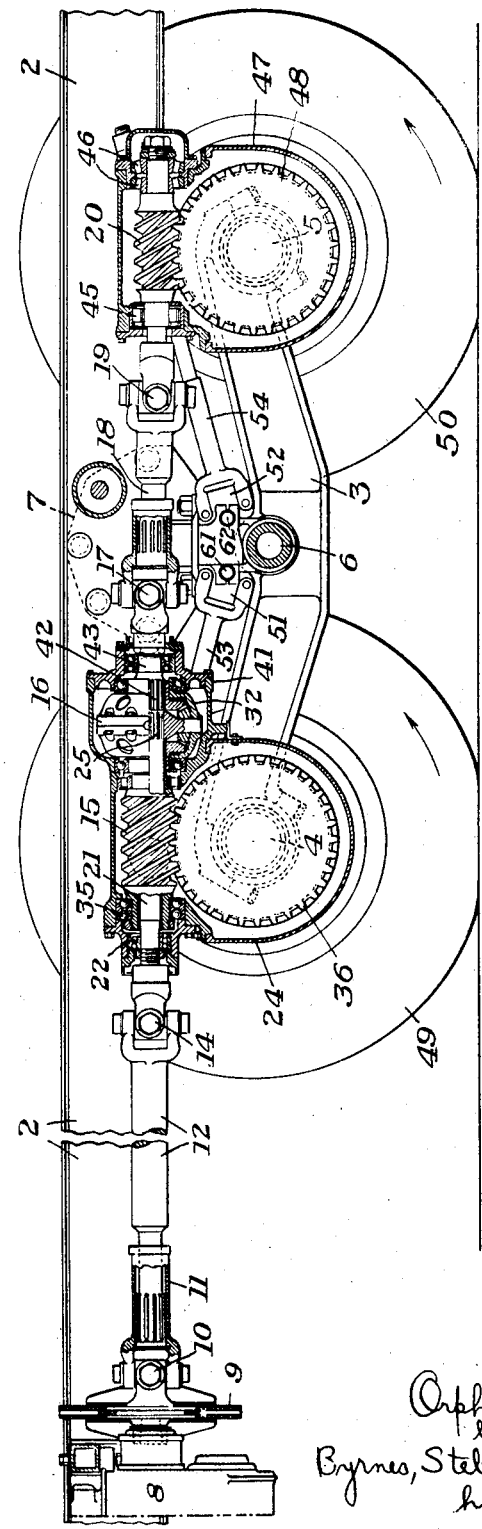
Figure 2 is a view partly in section and partly in elevation illustrating a preferred driving construction and manner of mounting the same.

Referring more particularly to Figure 1 of the drawings, I have shown diagrammatically a structure comprising a driving axle A and a second driving axle B. The driving wheel C carried by the axle A is illustrated as displaced approximately 6 inches above the normal road level so indicated, while the driving wheel D is illustrated as displaced approximately 6 inches below such normal level, thus disposing the axes of the axles A and B in planes which are spaced vertically a distance of approximately 12 inches.

The axle A carries a worm wheel E in driving engagement with a worm F, the axle B being similarly driven by means of a worm wheel and worm G and H, respectively. The worms are interconnected by means of a universal shaft I connected to the respective worms through universal joints J and K.

By reference to Figure 1, it will be noted that the worms F and H are illustrated as extending accurately in line with the universal shaft I, even though the driving axles are displaced in the manner referred to. By reason of such relationship, it will be apparent that the universal joints J and K are at no time called upon to perform any substantial amount of work in addition to power transmission. The present invention contemplates means for changing the angular plane of the axes of the worms in accordance with vertical displacement of the driving wheels.

It has heretofore been considered essential in the art to maintain the angular plane of the driving worms absolutely unchangeable, the worms being mounted rigidly in bearings to preclude any change in their position. It has apparently been contemplated that during the major portion of the truck life the truck will be travelling over a substantially level surface and therefore by holding the worms against displacement with their axes in substantially horizontal planes, they will, for the major portion of the life of the truck, represent a relationship which will accommodate itself satisfactorily to the universal shaft. In dotted lines in Figure 1 this normal relationship of the parts is indicated.

With such a construction, however, when the axles are displaced in the manner referred to, it will be apparent that the universal shaft I' is caused to assume an angular relationship with respect to the worm axis such that the universal joints J' and K' work through angles which are sufficiently acute to result in sufficient friction and heat to melt the contacting parts. It will thus be apparent from Figure 1 that the present invention contemplates a radical departure in that deliberate provision for changing the angular plane of the worm axes is provided as distinguished from existing structures.

With this preliminary explanation, reference may be had to the remaining figures of the drawings wherein an actual embodiment of the present invention is illustrated. In these drawings there is shown part of a vehicle chassis 2 with which cooperates a truck frame 3 carrying driving axles 4 and 5 respectively. The truck frame is journaled on a tube 6 extending transversely of the chassis, and permitting vertical displacement of the axes under uneven road conditions, in the manner hereinbefore described. The truck frame including the tube 6 may, in accordance with the present invention, be rigidly tied to the chassis 2 through the medium of suitable brackets 7, thus entirely eliminating heavy springs of the character heretofore utilized.

It is to be understood that each of the driving axles 4 and 5 may be provided with a differential as is customarily provided in motor vehicles to permit relative rotative movements between the respective wheels on opposite ends of a given axle. Each axle is in turn adapted to be driven from a transmission 8 through the medium of a coupling 9 carrying part of a universal joint 10. The opposite part of the universal joint carries a sleeve 11 which is internally splined to cooperate with the front end of a propeller shaft 12, the splines permitting a telescopic movement between the parts, as well understood in the art. At its rear end, the propeller shaft 12 cooperates through the medium of a universal joint 14 with a universal shaft assembly. This universal shaft assembly includes a front worm 15, a differential 16, a front universal 17, a telescopic shaft 18, a rear universal 19 and a rear worm 20.

Figure 4:
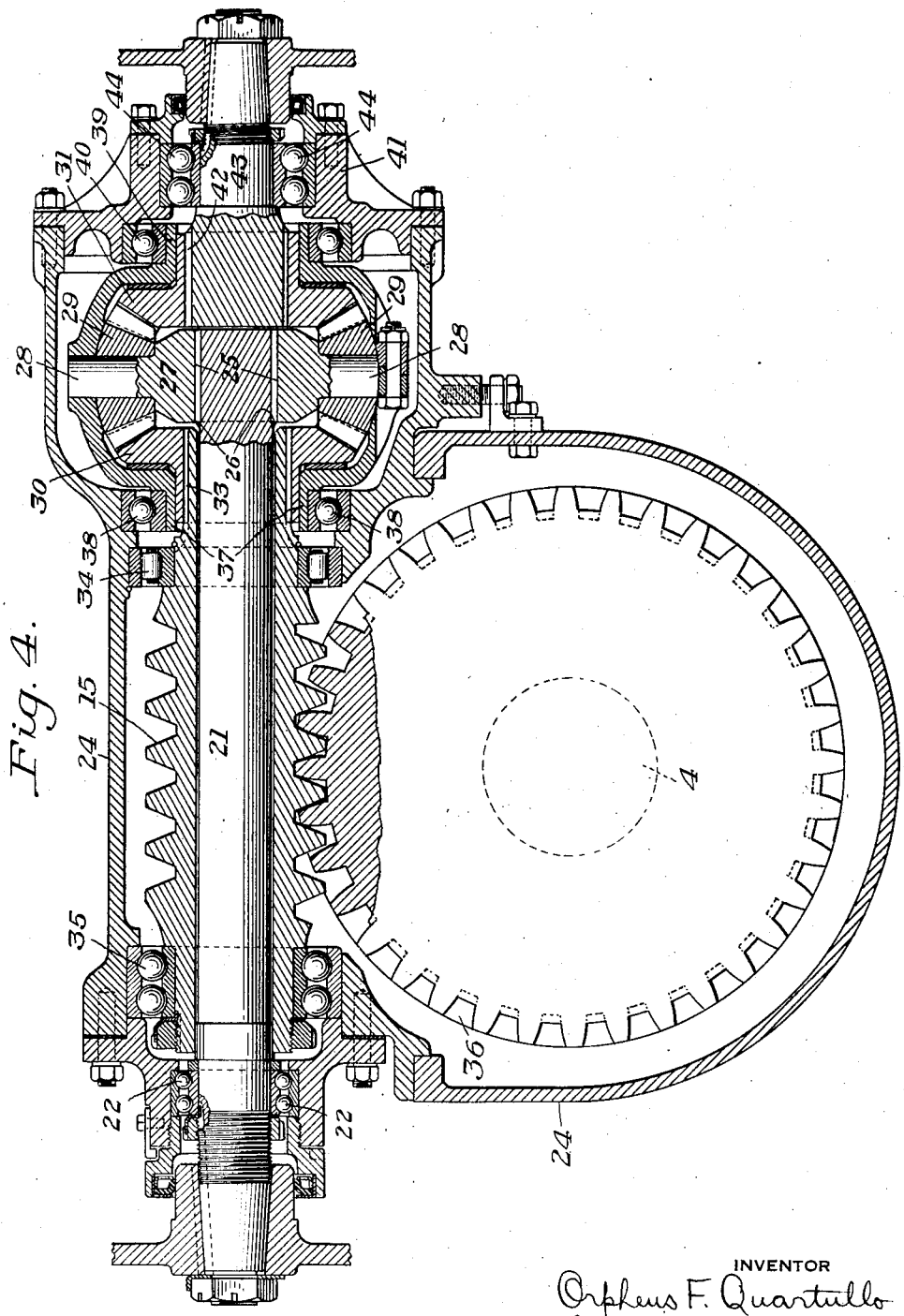
Figure 4 is a detail sectional view on an enlarged scale of the short shaft differential.

Connected to the universal joint 14 is a short shaft 21 journaled adjacent the joint in an anti-friction bearing 22 provided in a suitable gear housing 24 surrounding the driving axle 4. This construction will be more readily apparent from Figure 4. At its rear end the shaft 21 carries splines 25 which directly mesh with corresponding splines 26 on the interior of a spider 27. This spider has radiating therefrom stub shafts 28 each of which carries a bevel pinion 29. These bevel pinions mesh on one side of the differential with a bevel gear 30, and on the opposite side of the differential with a second bevel gear 31. The bevel gear 30 is rotatable directly within the differential housing 32 and has a splined driving engagement 33 with the worm 15. It is to be noted that the worm 15 adjacent its rear end is mounted in a roller bearing 34 and at its front end in an anti-friction bearing 35. These bearings are in concentric relationship to the shaft spindle 21 and are effective for maintaining the worm 15 out of engagement with the shaft spindle. The worm 15 in turn meshes with and is effective for driving a worm wheel 36 on the axle 4.

The differential housing 32 is provided on its front side with an extension 37 mounted in an anti-friction bearing 38, and adjacent its opposite side with a similar extension 39 mounted in a bearing 40. The bearings 38 and 40 are in turn mounted in a suitable housing 41 constituting an extension of the gear housing 24.

The gear 31, similarly to the gear 30, is journaled for rotation directly in the housing 32 and has a splined driving engagement 42 with a shaft spindle 43. This shaft spindle has an anti-friction bearing 44 in the housing 41.

The spindle 43 is connected through the medium of the universal joint 17 with the shaft 18, which shaft comprises telescopically mounted sections similarly to those before described in connection with the propeller shaft. At its rear end, the universal shaft 18 is connected through the universal joint 19 with the rear worm 20.

This worm, similarly to the worm 15, is also mounted at its opposite ends in suitable antifriction bearings 45 and 46 respectively, carried by a suitable gear casing 47. Within the gear casing is a worm wheel 48 secured to the axle 5, and in driving relationship with the worm 20.

With this construction, it will be assumed that it is desired to drive the wheels 49 and 50 in the direction indicated by the respective arrows thereon. In such case the propeller shaft 12 will be rotated in a clockwise direction as viewed by an observer standing in front of the vehicle. This will be effective under normal conditions for driving each of the worms 15 and 20 in the same clockwise direction with respect to such observer, and the driving wheels will turn in the direction indicated which will cause the vehicle to move forward. If the tires on the driving wheels are of exactly the same rolling diameter, and if the vehicle is travelling in a straight line, the differential 16 will not be called into play. If, however, the tires are of different rolling diameters, it will be readily apparent that a slight differential movement will be necessary to compensate for such difference in the diameter of the driving wheels. This makes it possible to change or renew any individual tire without regard to the necessity of simultaneously renewing all of the tires on all of the driving wheels.

Furthermore, if the tires are of equal rolling diameters, and one of the wheels should encounter a deep hole or a raised obstruction in the road, and therefore be raised or lowered out of the plane of the other driving wheels, said wheel will necessarily travel a greater distance than the other driving wheels that are travelling on a level plane. The particular axle upon which this wheel is mounted is therefore driven faster than the other driving axles, and it is readily apparent that a slight differential movement will be necessary to compensate for such difference in speed of the other driving axles, therefore differential 16 will readily compensate any difference in speed in the driving axles.

Reference has heretofore been made to the brackets 7, it having been stated that such brackets may be directly connected to the truck frames 3 so as to carry such frames and also the tube 6. The brackets 7 are likewise adapted to serve as supporting means for universals 51 and 52. These universals are connected through connecting rods 53 and 54 respectively with spherical heads 55 and 56 formed on the upper ends of arms 57 and 58. The arm 57 is connected to the casing 24, while the arm 58 is similarly connected to the casing 47.

Figure 3:
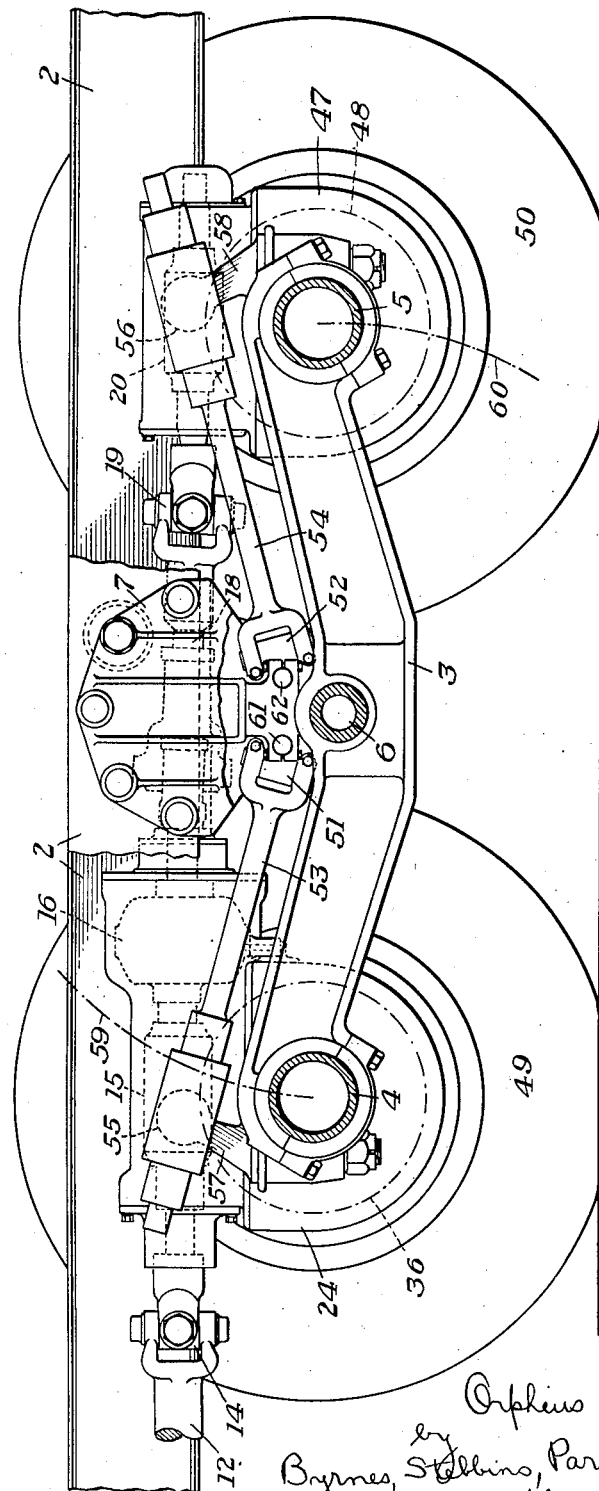
Figure 3 is a view similar to Figure 2, but illustrating the opposite side of the parts shown in Figure 2.

By reason of this construction, if it be assumed that the driving wheels 49 and 50 tend to assume the relationship of the corresponding driving wheels C and D of Figure 1, it will be apparent that the driving axle 4 will tend to move upwardly along the arc 59, while the axle 5 will tend to move downwardly along a similar arc 60, these two arcs constituting part of a common circle having as its center the axis of the tube 6. As the axle 4 moves upwardly, the connecting rod 53 being of constant length and operable about a center 61 will tend to rotate the casing 24 in a clockwise direction as viewed in Figure 3, about the axis of the axle 4, while the connecting rod 54 movable about a fixed center 62, will tend to produce a similar clockwise rotation of the casing 47. Since the worms 15 and 20 respectively are journaled in the casings 24 and 47, the rotational movement of the casings will dispose the worms substantially in the position illustrated in full lines in Figure 1, thus maintaining the same or substantially the same straight line relationship between the axis of the universal shaft 18 and the axes of the worms 15 and 20. The universals 17 and 19 in such case are only called upon to perform a power transmitting function and not called upon to operate under extreme angularity.

If it be assumed that the drive wheels 49 meet an obstruction while the wheels 50 remain on level ground, it will be apparent that driving axle 4 and tube 6 will move upwardly along the arcs of circles having the axis of axle 5 as the common center. The effect of this movement will be to cause the worms to be disposed in a position midway between the position shown in full lines and dotted lines in Figure 1. This is readily apparent when we consider that the axis of tube 6 has been moved upwardly and that the axis of axle 4 and the axis of axle 5 have been rotated in a clockwise direction around the tube 6. The effect of the movement of the axles 4 and 5 around tube 6 considered alone would be similar to that already described in the preceding paragraph and would cause the worms and the universal shaft to be in substantial alinement, as shown in full lines in Figure 1. However, the upward movement of tube 6 when considered alone would cause the worm casings to move in a counterclockwise direction. The resultant of these movements will cause the worms and the universal shaft to assume a position midway between the position shown in full lines and in dotted lines in Figure 1. The angularity will be thus distributed between universal joints 14, 17, 35 and 19.

In Figure 1 a true straight line relationship is maintained, such a relationship being entirely feasible in accordance with the present invention. Such a construction, however, would necessitate the connecting rods 53 and 54 having the same axis at their adjacent ends as the axis of the tube 6. If this relationship existed, a desired condition would exist as between the worms 15 and 20 and the universal shaft 18, but the universal 14 would be called upon to operate through a sharper angle.

In accordance with the preferred embodiment of my invention, the connecting rods 53 and 54 have their mounting axes 61 and 62 disposed a sufficient distance above the axis of the tube 6 so that the universal joints 14, 17 and 19 are all called upon to perform the same amount of compensating action. In other words, the change in angularity is substantially evenly divided between all of these joints. Thus in no case is any universal joint called upon to perform an excessive amount of compensating action, the angular relationship between the universal shaft 18 and the axes of the worms 15 and 20 never being in any way comparable with the angular relationship illustrated in dotted lines in Figure 1.

A structure in accordance with the present invention provides for the necessary differential movement between the driving wheels on the respective driving axles and enables the driving wheels to be placed in as closely adjacent relationship as desired without objectionably imposing upon any of the universal joints provided. It may be pointed out that this desirable condition of operation is obtained by making provision for changing the angular plane of the axes of the driving worms upon relative vertical movement between the driving axles.

As before pointed out, the truck frames 3 may be rigidly connected to the vehicle chassis 2, thereby obviating the provision of springs and the additional load which such springs represent.

The advantages of the invention will be apparent from the foregoing description taken in connection with the drawings, from which it will be understood that changes in the construction and relationship of the parts may be made without departing either from the spirit of the invention or the scope of my broader claims.

I claim:

1. In a motor vehicle, a plurality of substantially parallelly disposed axles, a common pivoted support for both axles, a worm wheel for driving each of said axles, a worm meshing with each worm wheel and effective for driving the same, a housing for each worm, means connecting the worm housings and the pivoted support for changing the angular plane of the axes of said worm, the same amount and in the same direction upon relative vertical movement between said axles, and driving means interconnecting said worms, said driving means including a differential and an axially extensible shaft having a plurality of separated universal joints therein.

2. In a motor vehicle, a plurality of substantially parallelly disposed axles, a common pivoted support for both axles, a worm wheel for driving each of said axles, a worm meshing with each worm wheel and effective for driving the same, a housing for each worm, means connecting the worm housings and the pivoted support for changing the angular plane of the axes of said worm, the same amount and in the same direction upon relative vertical movement between said axles, said means comprising rods having a ball joint at one end and a universal joint at the other end, the longitudinal axis of said means lying on one side of the line passing through the center of the support and the center of the axle.

3. In a motor vehicle, a chassis, a truck frame carrying driving axles, a pivotal mounting for said frame, a support for the pivotal mounting, a propeller shaft, a universal shaft assembly driven thereby, a universal joint intermediate said propeller shaft and universal shaft assembly, two other universal joints in said universal shaft assembly intermediate the ends thereof, a differential in said universal shaft assembly, driving worms driven by said differential, axles driven by said worms, a housing for each worm, and means connecting each of the worm housings with the said pivotal connection for changing the angular plane of the axes of said worms in the same direction and in the same amount upon relative vertical movement between said axles, whereby the deflection caused by the relative vertical movement of the axles is distributed between the three universal joints, said last-mentioned means comprising rigid members attached at one end to the worm housings and at their other ends to the support adjacent its pivotal mounting, each member lying wholly to one side of the vertical axis of the pivotal mounting.

4. In a motor vehicle, a chassis, a plurality of driving axles, a truck frame for supporting the axles, a pivotal mounting for said truck frame, a support connecting the pivotal mounting to the chassis, driving means including a worm for each of said axles, a rigid mounting for each of said worms, a driving spindle extending through one of said worms, a differential driven by said spindle and effective intermediate said worms for driving the same, and universal movable means for effecting relative rotation of said worm mountings upon relative vertical movement between said axles, said universal movable means comprising rods attached at one end with the rigid mounting of the worms, and at their other ends to the support adjacent its pivotal mounting for effecting relative movement of said mountings in the same direction and in the same amount upon relative vertical movement between said axles.

5. In a motor vehicle, a chassis, two substantially parallel driving axles, a truck frame for supporting said driving axles, a support for said frame connected to the chassis, a pivotal mounting therein on which the truck frame is mounted, driving means for said axles, comprising a driving spindle, a spider into which said spindle extends, a sliding driving engagement between said spindle and spider, differential gears driven by said spider, driving means connected to each of said differential gears, and mountings for said driving means, there being universally movable means for changing the angular relationship of said mountings in the same direction and in the same amount, said universally movable means comprising rods connected at one end with the mountings of the said driving means and at the other end to the support adjacent its pivotal mounting.

6. In a motor vehicle, a chassis, a truck frame, a pair of axle units arranged one behind the other and mounted for movement in a vertical arc relative to each other and relative to the chassis, an axle within each unit, a housing for each axle, a propeller shaft assembly for transmitting power from a motor on the chassis to each of said axle units, said driving shaft having a universal joint in advance of the first axle, a differential between the axle units, and a pair of universal joints between said axles, driving gears on the drive shaft assembly for each axle unit, and means for effecting limited rotative movement of said axle housings in the same direction and in the same amount upon movement of one of said axles in a vertical arc relatively to the other, whereby the drive shaft is flexed at the three universal joints and the deflection caused by the relative vertical movement of the axles is distributed between the three universal joints.

7. A truck for a motor vehicle, comprising a pair of driving axles arranged one behind the other, a housing for each axle rotatable relatively thereto, a frame structure connecting the housings and in which the housings are rotatable, a pivotal support for said frame structure, a bracket for rigidly connecting the support to the frame, a driving gear on each housing for driving the respective axles, a drive shaft arrangement for connecting the driving gears with a motor, said drive shaft having a universal joint therein in advance of the first axle, a pair of universal joints therein between said axles, a differential between said axles, and non-extensible means lying on one side of the line joining the center of the pivotal support and the respective axles connecting the housings with the said bracket causing rotation of said housings through a limited arc upon relative vertical movement of the axles, whereby the angular planes of the driving gears are changed with variations in the relative vertical positions of the axles whereby the drive shaft is flexed at the three universal joints, and the deflection caused by the relative vertical movement of the axles is distributed between the three universal joints.

8. In a motor vehicle, a chassis, a load supporting shaft, a bracket rigidly connecting said shaft to the chassis, a truck frame carried by said shaft, wheel driving axles journaled adjacent the end of the said truck frame, a propeller shaft extending at right angles to said axles, a driving worm, a worm gear on one of said driving axles meshing with said worm, said worm being journaled in a housing rotatable about said one of said driving axles, a rod, one end of which has a universal connection to the worm housing, the other end being connected universally to a point on the bracket adjacent its pivotal mounting in eccentric relation to the load bearing shaft and on the side of the bracket nearer the worm housing, the longitudinal axis of said rod lying wholly to one side of the vertical line passing through the center of the support and the center of the respective axles, and an axially extensible coupling for said propeller shaft.

9. The combination claimed in claim 8 wherein there is provided a second worm for said other driving axle, a housing and rod therefor similar to that provided for the first axle for connecting the housing and the bracket, a short shaft for transmitting power from the first worm to the second, a differential between said worms, an axially extensible coupling for said short shaft, and a universal joint in said short shaft adjacent each end thereof.

ORPHEUS F. QUARTULLO.